United States Patent
Wessel et al.

(10) Patent No.: US 9,336,800 B2
(45) Date of Patent: *May 10, 2016

(54) NEAR-FIELD TRANSDUCER PEG ENCAPSULATION

(71) Applicant: Seagate Technology LLC, Cupertino, CA (US)

(72) Inventors: James Gary Wessel, Savage, MN (US); Sarbeswar Sahoo, Shakopee, MN (US); Michael Christopher Kautzky, Eagan, MN (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/816,341

(22) Filed: Aug. 3, 2015

(65) Prior Publication Data

US 2015/0340050 A1   Nov. 26, 2015

Related U.S. Application Data

(63) Continuation of application No. 14/220,396, filed on Mar. 20, 2014, now Pat. No. 9,099,117, which is a continuation-in-part of application No. 14/083,845, filed on Nov. 19, 2013, now abandoned.

(60) Provisional application No. 61/838,862, filed on Jun. 24, 2013.

(51) Int. Cl.
*G11B 5/00* (2006.01)
*G11B 5/31* (2006.01)
*G11B 5/48* (2006.01)
*G11B 5/012* (2006.01)
*G11B 5/187* (2006.01)
*G11B 5/127* (2006.01)
*G11B 5/60* (2006.01)
*G02B 6/122* (2006.01)
*G02B 5/00* (2006.01)

(52) U.S. Cl.
CPC ........... *G11B 5/3163* (2013.01); *G02B 6/1226* (2013.01); *G11B 5/012* (2013.01); *G11B 5/1278* (2013.01); *G11B 5/187* (2013.01); *G11B 5/314* (2013.01); *G11B 5/3133* (2013.01); *G11B 5/4866* (2013.01); *G11B 5/6088* (2013.01); *G02B 5/008* (2013.01); *G11B 2005/0021* (2013.01)

(58) Field of Classification Search
None
See application file for complete search history.

(56) References Cited

U.S. PATENT DOCUMENTS 5,600,619 A   2/1997   Takekoshi et al.
5,680,385 A   10/1997   Nagano (Continued)

FOREIGN PATENT DOCUMENTS

WO   WO2013163195   10/2013

OTHER PUBLICATIONS

File History for U.S. Appl. No. 14/313,197.

(Continued)

*Primary Examiner* — Brian Butcher
(74) *Attorney, Agent, or Firm* — Hollingsworth Davis, LLC

(57) ABSTRACT

A near field transducer with a peg region, an enlarged region disposed adjacent the peg region, and a barrier material disposed between the peg region and the enlarged region. The barrier material reduces or eliminates interdiffusion of material between the peg region and the enlarged region.

20 Claims, 6 Drawing Sheets

(56) References Cited

U.S. PATENT DOCUMENTS

| | | |
|---|---|---|
| 7,391,590 B2 | 6/2008 | Matono et al. |
| 7,500,255 B2 | 3/2009 | Seigler et al. |
| 7,609,480 B2 | 10/2009 | Shukh et al. |
| 7,649,713 B2 | 1/2010 | Ota et al. |
| 7,786,086 B2 | 8/2010 | Reches et al. |
| 7,818,760 B2 | 10/2010 | Seigler et al. |
| 7,848,056 B2 | 12/2010 | Sakamoto et al. |
| 7,986,481 B2 | 7/2011 | Yamanaka et al. |
| 8,077,558 B1 | 12/2011 | Tsutsumi et al. |
| 8,077,559 B1 | 12/2011 | Miyauchi et al. |
| 8,194,511 B2 | 6/2012 | Sasaki et al. |
| 8,320,219 B1 | 11/2012 | Wolf et al. |
| 8,320,220 B1 | 11/2012 | Yuan et al. |
| 8,339,740 B2 | 12/2012 | Zou et al. |
| 8,351,307 B1 | 1/2013 | Wolf et al. |
| 8,351,308 B2 | 1/2013 | Chou et al. |
| 8,374,062 B2 | 2/2013 | Tanaka et al. |
| 8,375,565 B2 | 2/2013 | Hu et al. |
| 8,400,902 B2 | 3/2013 | Huang et al. |
| 8,406,094 B2 | 3/2013 | Matsumoto |
| 8,427,925 B2 | 4/2013 | Zhao et al. |
| 8,451,555 B2 | 5/2013 | Seigler et al. |
| 8,451,705 B2 | 5/2013 | Peng et al. |
| 8,477,454 B2 | 7/2013 | Zou et al. |
| 8,514,673 B1 | 8/2013 | Zhao et al. |
| 8,526,275 B1 | 9/2013 | Yuan et al. |
| 8,547,805 B1 | 10/2013 | Komura et al. |
| 8,565,049 B1 | 10/2013 | Tanner et al. |
| 8,570,844 B1 | 10/2013 | Yuan et al. |
| 8,605,555 B1 | 12/2013 | Chernyshov et al. |
| 8,634,280 B1 | 1/2014 | Wang et al. |
| 8,670,215 B2 | 3/2014 | Zou et al. |
| 8,681,590 B2 | 3/2014 | Zhou et al. |
| 8,705,327 B2 | 4/2014 | Matsumoto |
| 8,796,023 B2 | 8/2014 | Reches et al. |
| 8,804,468 B2 | 8/2014 | Zhao et al. |
| 8,817,407 B2 | 8/2014 | Wessel et al. |
| 8,824,086 B2 | 9/2014 | Peng et al. |
| 8,842,391 B2 | 9/2014 | Zou et al. |
| 8,929,181 B2 | 1/2015 | Peng et al. |
| 9,099,117 B2 * | 8/2015 | Wessel et al. |
| 2004/0004792 A1 | 1/2004 | Hasegawa et al. |
| 2005/0024957 A1 | 2/2005 | Gider et al. |
| 2005/0041950 A1 | 2/2005 | Rottmayer et al. |
| 2006/0233061 A1 | 10/2006 | Rausch et al. |
| 2007/0036040 A1 | 2/2007 | Mihalcea et al. |
| 2007/0139818 A1 | 6/2007 | Shimazawa et al. |
| 2008/0009434 A1 | 1/2008 | Reches et al. |
| 2010/0214685 A1 | 8/2010 | Seigler et al. |
| 2010/0291828 A1 | 11/2010 | Reches et al. |
| 2010/0328807 A1 | 12/2010 | Snyder et al. |
| 2011/0170381 A1 | 7/2011 | Matsumoto |
| 2011/0205863 A1 | 8/2011 | Zhao et al. |
| 2011/0235480 A1 | 9/2011 | Goulakov et al. |
| 2011/0286128 A1 | 11/2011 | Tsutsumi et al. |
| 2011/0294398 A1 | 12/2011 | Hu et al. |
| 2012/0039155 A1 | 2/2012 | Peng et al. |
| 2012/0045662 A1 | 2/2012 | Zou et al. |
| 2012/0075965 A1 | 3/2012 | Tanaka et al. |
| 2012/0075967 A1 | 3/2012 | Chou et al. |
| 2012/0218871 A1 | 8/2012 | Balamane et al. |
| 2013/0070576 A1 | 3/2013 | Zou et al. |
| 2013/0258824 A1 | 10/2013 | Komura et al. |
| 2013/0279315 A1 | 10/2013 | Zhao et al. |
| 2013/0286804 A1 | 10/2013 | Zhao et al. |
| 2013/0286806 A1 | 10/2013 | Wessel et al. |
| 2013/0330573 A1 | 12/2013 | Zhao et al. |
| 2013/0343167 A1 | 12/2013 | Zou et al. |
| 2014/0004384 A1 | 1/2014 | Zhao et al. |
| 2014/0043948 A1 | 2/2014 | Hirata et al. |
| 2014/0050057 A1 | 2/2014 | Zou et al. |
| 2014/0050058 A1 | 2/2014 | Zou et al. |
| 2014/0226450 A1 | 8/2014 | Peng et al. |
| 2014/0376340 A1 | 12/2014 | Cheng et al. |
| 2014/0376341 A1 | 12/2014 | Wessel et al. |
| 2014/0376342 A1 | 12/2014 | Wessel et al. |
| 2014/0376343 A1 | 12/2014 | Cheng et al. |
| 2014/0376344 A1 | 12/2014 | Zhao et al. |
| 2014/0376345 A1 | 12/2014 | Seets et al. |

OTHER PUBLICATIONS

File History for U.S. Appl. No. 14/069,960.
File History for U.S. Appl. No. 14/276,388.
File History for U.S. Appl. No. 14/083,845.
File History for U.S. Appl. No. 14/220,396.
File History for U.S. Appl. No. 14/286,279.

* cited by examiner

NEAR-FIELD TRANSDUCER PEG ENCAPSULATION

RELATED PATENT DOCUMENTS

This application is a continuation of U.S. application Ser. No. 14/220,396, filed Mar. 20, 2014, which is a continuation-in-part of U.S. application Ser. No. 14/083,845, filed Nov. 19, 2013, which claims the benefit of U.S. Provisional Patent Application Ser. No. 61/838,862 filed on Jun. 24, 2013, to which priority is claimed pursuant to 35 U.S.C. §119(e), which are hereby incorporated herein by reference in their entireties.

SUMMARY

Embodiments disclosed include a near field transducer with a peg region, an enlarged region disposed adjacent the peg region, and a barrier material disposed between the peg region and the enlarged region. The barrier material reduces or eliminates interdiffusion of material between the peg region and the enlarged region.

Embodiments are directed to a system for a heat assisted magnetic recording head that includes a near field transducer having a peg region, an enlarged region, and a barrier material. The barrier material is disposed between the peg region and the enlarged region to reduce interdiffusion of material between the peg region and the enlarged region.

Further embodiments are directed to a method of fabricating a near field transducer for a heat assisted magnetic recording head including forming a peg region along a substrate of a heat assisted magnetic recording head, disposing a sacrificial material over a first portion of the peg region leaving a second portion of the peg region exposed, fabricating a barrier material over at least the second portion of the peg region, forming an enlarged region adjacent the second portion of the peg region such that the barrier material is disposed at least between the second portion and the enlarged region to reduce interdiffusion between the peg region and the enlarged region, and removing the sacrificial material.

The above summary is not intended to describe each disclosed embodiment or every implementation of the present disclosure. The figures and the detailed description below more particularly exemplify illustrative embodiments.

BRIEF DESCRIPTION OF THE DRAWINGS

Throughout the specification reference is made to the appended drawings, where like reference numerals designate like elements, and wherein.

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

Figure 1:
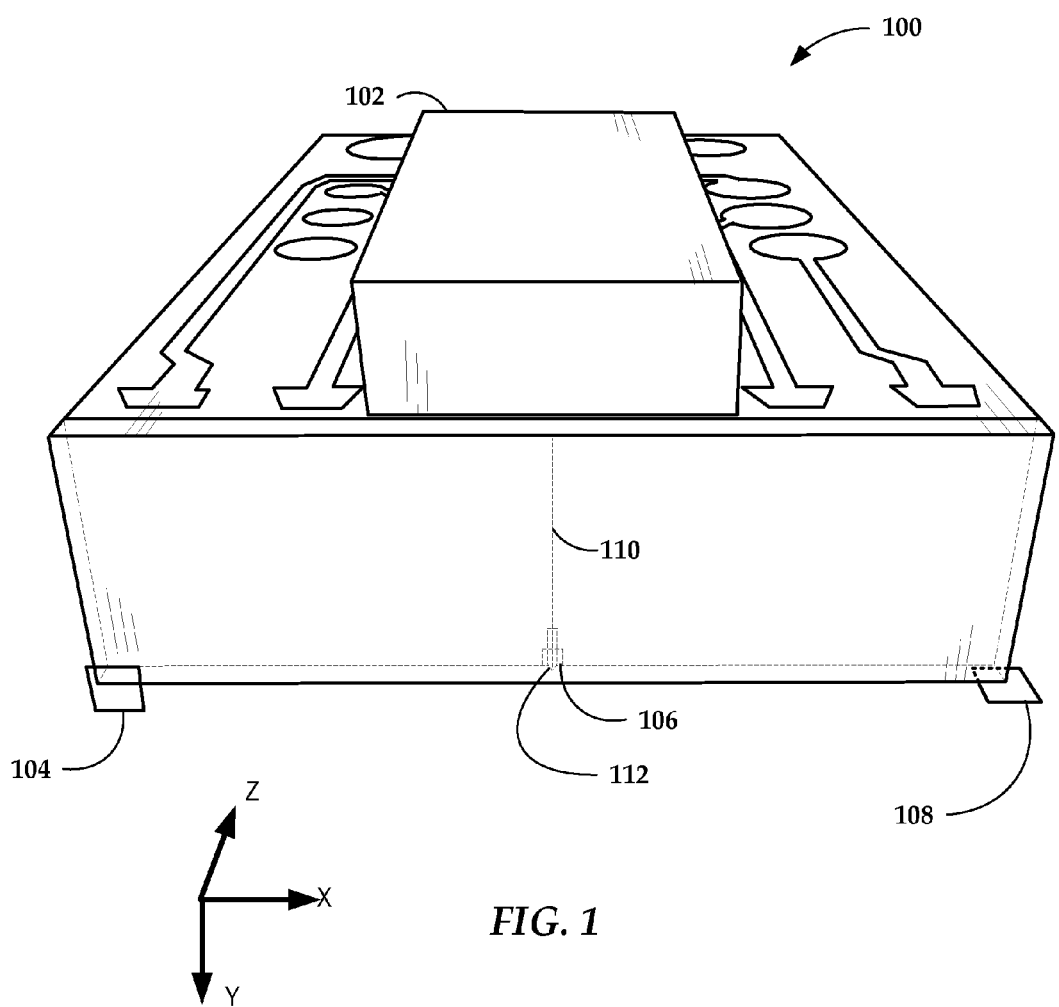
FIG. 1 is a perspective view of a hard drive slider that includes a disclosed near-field transducer.

In the following description, reference is made to the accompanying set of drawings that form a part of the description hereof and in which are shown by way of illustration several specific embodiments. It is to be understood that other embodiments are contemplated and may be made without departing from the scope of the present disclosure. The following detailed description, therefore, is not to be taken in a limiting sense.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range.

Various embodiments disclosed herein are generally directed to systems and apparatuses that facilitate coupling a laser diode to a magnetic writer that includes a magnetic write head. In particular, the systems and apparatuses include a plasmonic near-field transducer for heat assisted magnetic recording (HAMR). Plasmonic near-field transducers (NFTs) can generate a large amount of heat in their writing tip also called a "peg" or "peg region". This heat can negatively impact the operational life of the near-field transducer. Disclosed are apparatuses, systems, and methods directed to increasing NFT operational life by reducing likelihood of peg recession of the writing tip. In particular, disclosed herein are systems, apparatuses, and methods that separate a peg region from the remainder of the NFT by a barrier material. This encapsulation of the peg region (writing tip) from the remainder of the NFT reduces or eliminates interdiffusion of material between the peg region and the remainder of the NFT. The reduction or elimination of interdiffusion of material reduces the likelihood of peg recession. Thus, the near-field transducer can better withstand heat buildup in the peg for HAMR.

The present disclosure relates to HAMR, which can be used to increase areal data density of magnetic media. In a HAMR device, information bits are recorded in a storage layer at elevated temperatures in a specially configured magnetic media. The use of heat can overcome superparamagnetic effects that might otherwise limit the areal data density of the media. As such, HAMR devices may include magnetic write heads for delivering electromagnetic energy to heat a small confined media area (spot size) at the same time the magnetic write head applies a magnetic field to the media for recording.

One way to achieve a tiny confined hot spot is to use an optical near-field transducer (NFT), such as a plasmonic optical antenna or an aperture, located near an air-bearing surface of a hard drive slider. Light may be launched from a light source (e.g., a laser diode) into optics such as a waveguide integrated into the slider. Light propagating in the waveguide may be directed to an optical focusing element, such as a planar solid immersion mirror (PSIM). The PSIM may concentrate the energy into a NFT. The NFT causes the energy to be delivered to the media in a very small spot.

FIG. 1 is a perspective view of a hard drive slider that includes a disclosed plasmonic NFT. HAMR slider 100 includes laser diode 102 located on top of HAMR slider 100 proximate to trailing edge surface 104 of HAMR slider 100. Laser diode 102 delivers light proximate to read/write head 106, which has one edge on air-bearing surface 108 (also referred to as "media-facing surface" or "media interfacing surface") of HAMR slider 100. Air-bearing surface 108 is held proximate to a moving media surface (not shown) during device operation.

Laser diode 102 provides electromagnetic energy to heat the media at a point near to read/write head 106. Optical coupling components, such as a waveguide 110, are formed integrally within HAMR slider 100 to deliver light from laser diode 102 to the media. In particular, waveguide 110 and NFT 112 may be located proximate read/write head 106 to provide local heating of the media during write operations. Laser diode 102 in this example may be an integral, edge-emitting device, although it will be appreciated that waveguide 110 and NFT 112 may be used with any light source and light delivery mechanisms. For example, a surface emitting laser (SEL) may be used instead of the edge firing laser illustrated.

While the example in FIG. 1 shows laser diode 102 integrated with HAMR slider 100, the NFT 112 discussed herein may be useful in any type of light delivery configuration. For example, in a free-space light delivery configuration, a laser may be mounted externally to the slider, and coupled to the slider by way of optic fibers and/or waveguides. The slider in such an arrangement may include a grating coupler into which light is coupled and delivered to slider-integrated waveguide 110 which energizes the NFT 112.

The HAMR device utilizes the types of optical devices described above to heat he magnetic recording media (e.g., hard disc) in order to overcome the superparamagnetic effects that limit the areal data density of typical magnetic media. When writing to a HAMR medium, the light can be concentrated into a small hotspot over the track where writing takes place. The light propagates through waveguide 110 where it is coupled to the NFT 112 either directly from the waveguide or by way of a focusing element. Other optical elements, such as couplers, mirrors, prisms, etc., may also be formed integral to the slider. The optical elements used in HAMR recording heads are generally referred to as integrated optics devices.

As a result of what is known as the diffraction limit, optical components cannot be used to focus light to a dimension that is less than about half the wavelength of the light. The lasers used in some HAMR designs produce light with wavelengths on the order of 700-1550 nm, yet the desired hot spot is on the order of 50 nm or less. Thus the desired hot spot size is well below half the wavelength of the light. Optical focusers cannot be used to obtain the desired hot spot size, being diffraction limited at this scale. As a result, the NFT 112 is employed to create a hotspot on the media.

The NFT 112 is a near-field optics device designed to reach local surface plasmon resonance at a designed wavelength. A waveguide and/or other optical element concentrates light on a transducer region (e.g., focal point) where the NFT 112 is located. The NFT 112 is designed to achieve surface plasmon resonance in response to this concentration of light. At resonance, a high electric field surrounds the NFT 112 due to the collective oscillations of electrons at the metal surface. Part of this field will tunnel into a storage medium and get absorbed, thereby raising the temperature of a spot on the media as it being recorded. NFTs generally have a surface that is made of a material that supports surface plasmons ("plasmonic metal") such as aluminum, gold, silver, copper, or alloys thereof. They may also have other materials but they must have a material that supports surface plasmons on their outer surface.

Figure 2:
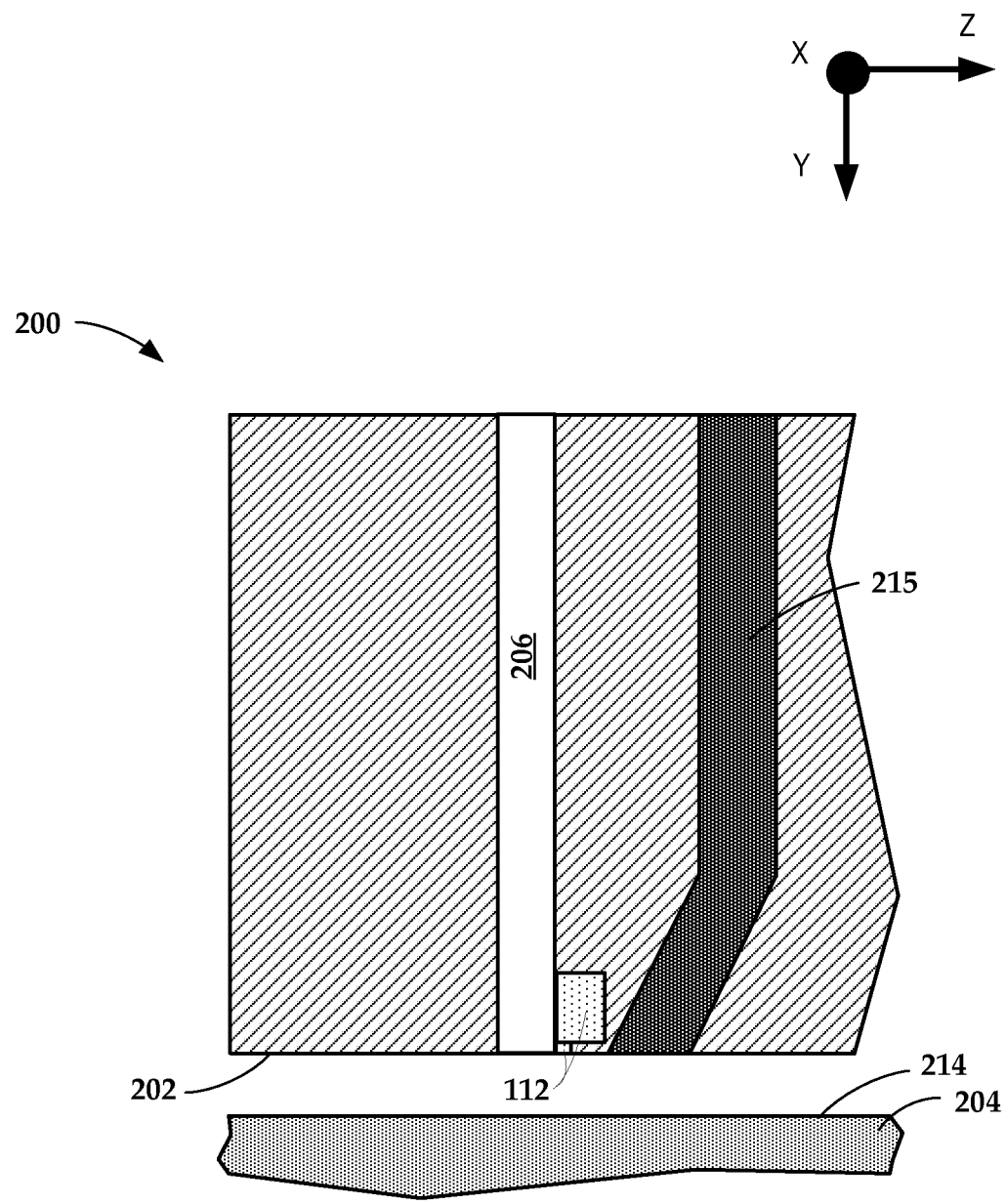
FIG. 2 is a side cross-sectional view of an apparatus that includes the near-field transducer of FIG. 1, a write pole, a heat sink, and a waveguide according to an example embodiment.

FIG. 2 is a cross-sectional view shows details of an apparatus 200 used for HAMR according to an example embodiment. The NFT 112 is located proximate a media interfacing surface 202 (e.g., ABS), which is held near a magnetic recording media 204 during device operation. In the orientation of FIG. 2, the media interfacing surface 202 is arranged parallel to the x-z plane. A waveguide 206 may be disposed proximate the NFT 112, which is located at or near the media writing surface 214.

The NFT 112, waveguide 206, and other components are built on a substrate plane, which is parallel to the x-y plane in this view. Waveguide 206 is shown configured as a planar waveguide, and is surrounded by cladding layers (not shown) that have different indices of refraction than a core of the waveguide 206. Other waveguide configurations may be used instead of a planar waveguide, e.g., channel waveguide. Light propagates through the waveguide 206. Electrical field lines emanate from the waveguide 206 and excite the NFT 112. The NFT 112 delivers surface plasmon-enhanced, near-field electromagnetic energy along the negative y-direction where it exits at the media interfacing surface 202. This may result in a highly localized hot spot (not shown) on the magnetic recording media 204. A magnetic recording pole 215 that is located alongside NFT 112. The magnetic recording pole 215 generates a magnetic field (e.g., perpendicular field) used in changing the magnetic orientation of the hotspot during writing.

Many NFT designs include an enlarged region as well a peg region. The enlarged region will typically comprise substantially 90% or more of the volume of the NFT in some embodiments. Although discussed as a separate region or portion, typically the peg region is integrally fabricated of a same material as the enlarged region. The specific wavelength of light from the laser diode dictates the size of the enlarged region of the NFT and a length of the peg region in order to get optimal (maximum) coupling efficiency of the laser light to the NFT.

As discussed previously, the peg region acts as the writing tip of the NFT while the enlarged region is configured to receive concentrated light from the laser diode/waveguide and is designed to help NFT achieve surface plasmon resonance in response to this concentration of light. The peg region is in optical and/or electrical communication with the enlarged region and creates a focal point for the energy received by the enlarged region.

As is known, temperature increases in the peg region are a challenge for the durability of HAMR devices. A temperature mismatch between the relatively higher temperature peg region and relatively lower temperature enlarged region as well as mechanical stresses are thought to lead to an exchange of material (and vacancies) between the two regions. As used herein, the term "material" additionally includes any vacancies within the material. The temperature mismatch between the two regions as wells as the mechanical stresses are thought to be phenomenon that drive peg deformation and peg recession, which can lead to failure of the HAMR device.

The present disclosure relates to apparatuses, systems, and methods related to an NFT for the HAMR device. In particular, embodiments of the NFT include a peg region that is separated from the remainder of the NFT by a barrier material. This encapsulation of the peg region from the remainder of the NFT reduces or eliminates interdiffusion of material between the peg region and the remainder of the NFT. The reduction or elimination of interdiffusion of material reduces the likelihood of peg recession and failure of the HAMR device.

Figure 3:
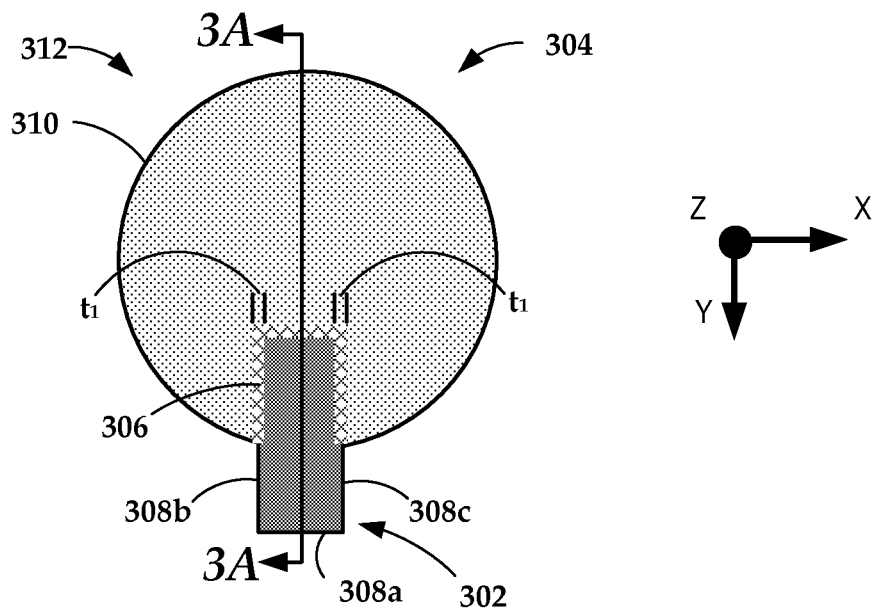
FIG. 3 is a first cross-sectional view of one embodiment of a near-field transducer that includes a peg region separated from an enlarged region by a barrier material.
Figure 3A:
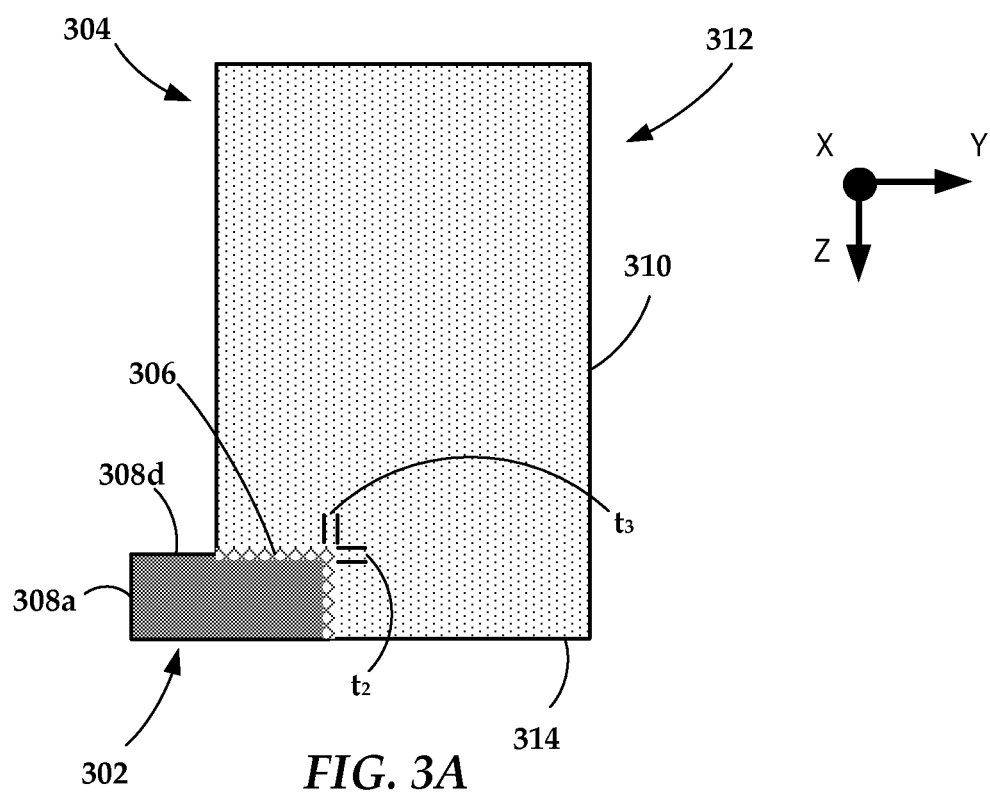
FIG. 3A is a second cross-sectional view of the near-field transducer of FIG. 3.

FIG. 3 shows a cross-sectional view of one embodiment of an NFT 312. FIG. 3A is a second cross-sectional view of the NFT 312. As illustrated in FIGS. 3 and 3B, the NFT 312 includes a peg region 302, an enlarged region 304, and a barrier material 306. Additionally, the peg region 302 includes surfaces 308a, 308b, 308c, and 308d and the enlarged region 304 includes arcuate surface 310 and bottom surface 314.

The enlarged region 304 is disposed adjacent the peg region 302. The barrier material 306 is disposed between the peg region 302 and the enlarged region 304 to reduce or eliminate interdiffusion of materials between the peg region 302 and the enlarged region 304. However, the peg region 302 remains in optical and/or electrical communication with the enlarged region 304.

The peg region 302 can extend from the enlarged region 304 toward media-facing surface (e.g., media interfacing surface 202 in FIG. 2). In the illustrated embodiment, the enlarged region 304 has a circular disk shape. In the context of describing the shape of the enlarged region 304, the term "disk" refers to three-dimensional shapes that include a cylindrical or tapered cylindrical portion, a bottom surface 314, and a top surface. Thus, the disk shape can include a truncated conical shape in some instances. The bottom surface 314 may or may not be arranged in a plane parallel with the top surface. The peg region 302 and the enlarged region 304 can be formed from a thin film of plasmonic metal (e.g., aluminum, gold, silver, copper, and combinations or alloys thereof) on a substrate plane of the slider proximate the write pole (e.g., magnetic recording pole 215 in FIG. 2). In some embodiments, the peg region 302 and the enlarged region 304 can be formed from the same material.

The barrier material 306 is disposed between the peg region 302 and the enlarged region 304, and in particular, is arranged to substantially separate (encapsulate) the peg region 302 from the enlarged region 304. As illustrated in FIGS. 3 and 3A, the barrier material 306 can be disposed on a portion of the peg region 302 opposing the surface 308a (i.e., a non-media interfacing end of the peg region 302). The length, thickness, and other dimensional and physical properties of the barrier material 306 will depend upon the composition of the peg region and enlarged region and upon the specific wavelength of light from the laser diode. In one embodiment the barrier material 306 has a thickness of between about 1.0 nm and about 10.0 nm.

As illustrated, the barrier material 306 disposed along a side of the peg region 302 can have thicknesses $t_1$ that differ from a thickness $t_2$ of the barrier material 306 disposed along a top of the peg region 302 and/or a thickness $t_3$ of the barrier material 306 disposed along a non-media interfacing back of the peg region 302. The barrier material 306 can be comprised of one or more of ZrN, TiN, Rh, Zr, Hf, Ru, AuN, AuO, TaN, Ir, W, Mo, Co, and alloys thereof. It is desirable that barrier material 306 create a diffusion barrier for Au and other plasmonic metals and have a thermal conductivity greater than about 10 W/m-K in some embodiments. It is also desirable in some instances that barrier material 306 has appreciable optical figure of merit. Although best described as a layer in some embodiments, barrier material 306 can include one or more layers or can be a component that is not layered in nature in some instances.

As shown in FIGS. 3 and 3A, the barrier material 306 encapsulates the peg region 302 by extending between the arcuate surface 310 and the bottom surface 314 of enlarged region 304. In the embodiment illustrated, the barrier material 306 extends along a plane that substantially aligns with surfaces 308b, 308c, and 308d of the peg region 302. However, in other embodiments the barrier material 306 may not substantially align with surfaces 308b, 308c, and 308d. As will be discussed subsequently, the barrier material 306 is fabricated to be self-aligned using electro-deposition, plasma treatment/annealing, dopant/annealing, and/or plasma treatment/electrochemical processing etc. In one embodiment, atomic layer deposition (ALD) of the barrier material 306 can be performed on various surfaces 308b, 308c, and 308d including, in particular, end surface 308a. Certain ALD metal(s), for example, Pt, can be selectively controlled such that a thin film cap forms over the end surface 308a (i.e. the ALD metal(s) nucleates on metal surfaces such as surfaces 308a, 308b, 308c, and 308d rather than on dielectrics or polymers). The self-aligned fabrication methods allow the barrier material 306 to be disposed substantially only between the peg region 302 and the enlarged region 304 according to various embodiments.

Figure 4:
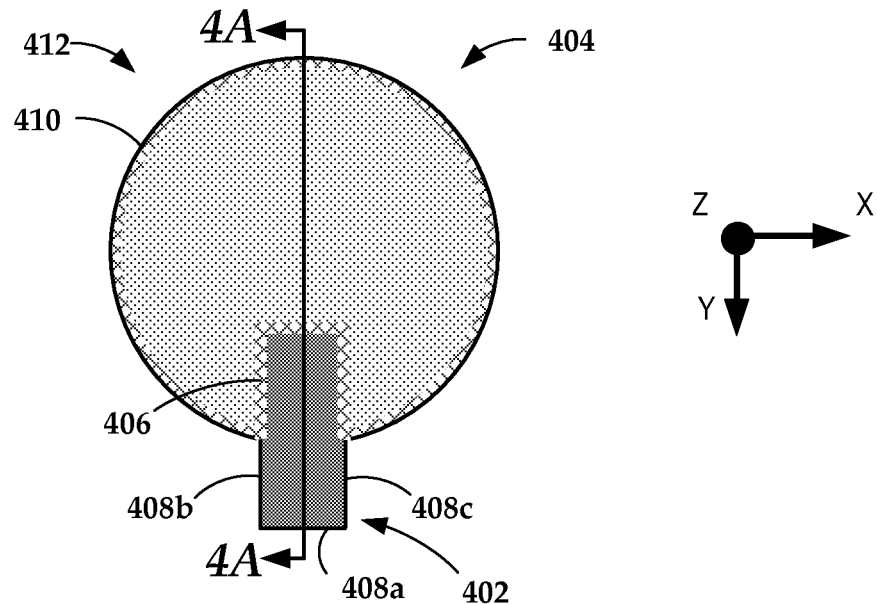
FIG. 4 is side cross-sectional view of another embodiment of a near-field transducer that includes a peg region separated from an enlarged region by a barrier material.
Figure 4A:
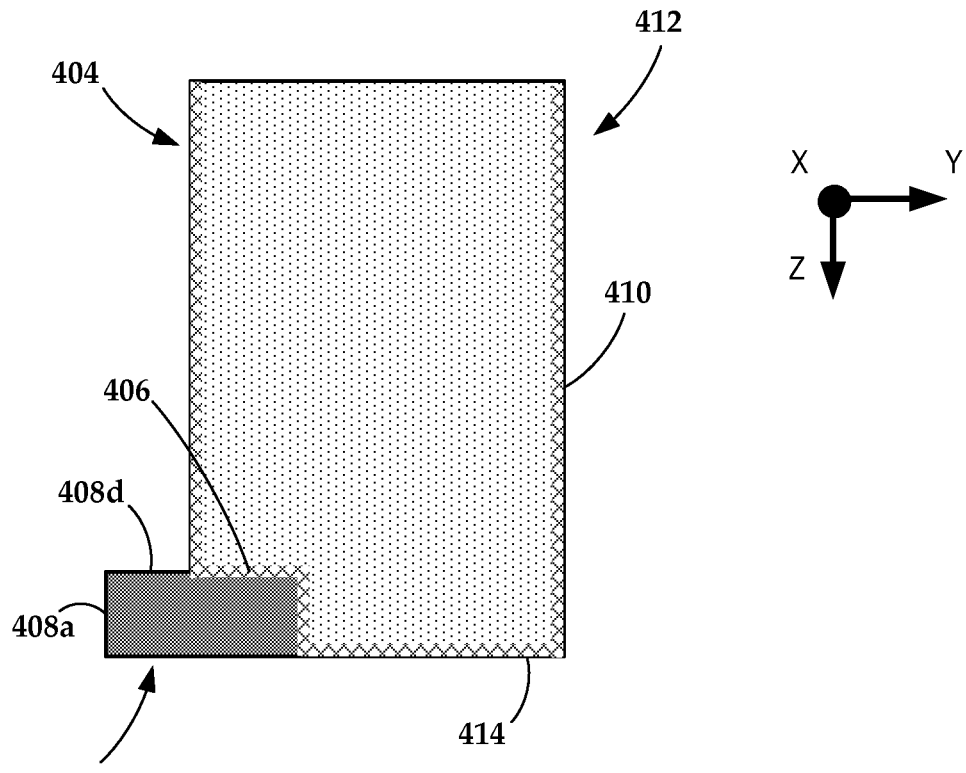
FIG. 4A is a second cross-sectional view of the near-field transducer of FIG. 4.

FIGS. 4 and 4A show another embodiment of an NFT 412 fabricated using non-self-aligned methods. FIG. 4 shows a first cross-sectional view of the NFT 412. FIG. 4A is a second cross-sectional view of the NFT 412. As illustrated in FIGS. 4 and 4B, the NFT 412 includes a peg region 402, an enlarged region 404, and a barrier material 406. Additionally, the peg region 402 includes surfaces 408a, 408b, 408c, and 408d and the enlarged region 404 includes an arcuate surface 410 and bottom surface 414.

The general characteristics of the NFT 412 have been previously described in reference to the NFT 312 of FIGS. 3 and 3A, and, therefore, will not be described in great detail. However, the embodiment of FIGS. 4 and 4A differs from that of FIGS. 3 and 3A in that the barrier material 406 is disposed between the enlarged region 404 and the peg region 402 and is additionally disposed along the arcuate surface 410 and the bottom surface 414 of the enlarged region 404. In FIGS. 4 and 4A, the barrier material 406 is fabricated to be non-self-aligned using known lithography methods, e.g. sputtering. The non-self-aligned fabrication methods allow the barrier material 406 to be disposed between the enlarged region 404 and the peg region 402 and along one or more additional surfaces of the enlarged region 404.

Figure 5:
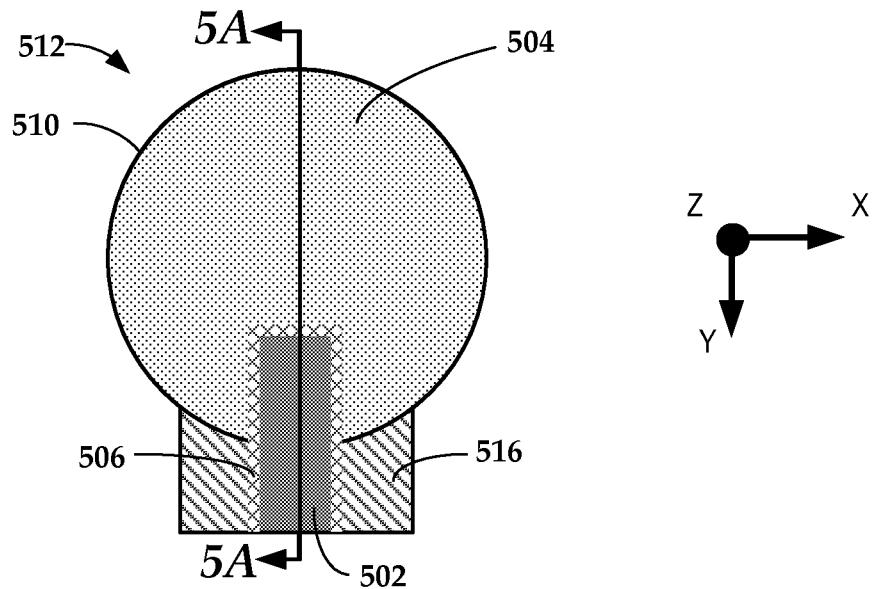
FIG. 5 is a cross-sectional view of another embodiment of a near-field transducer with a spacing element and a peg region of the near-field transducer separated from one another.
Figure 5A:
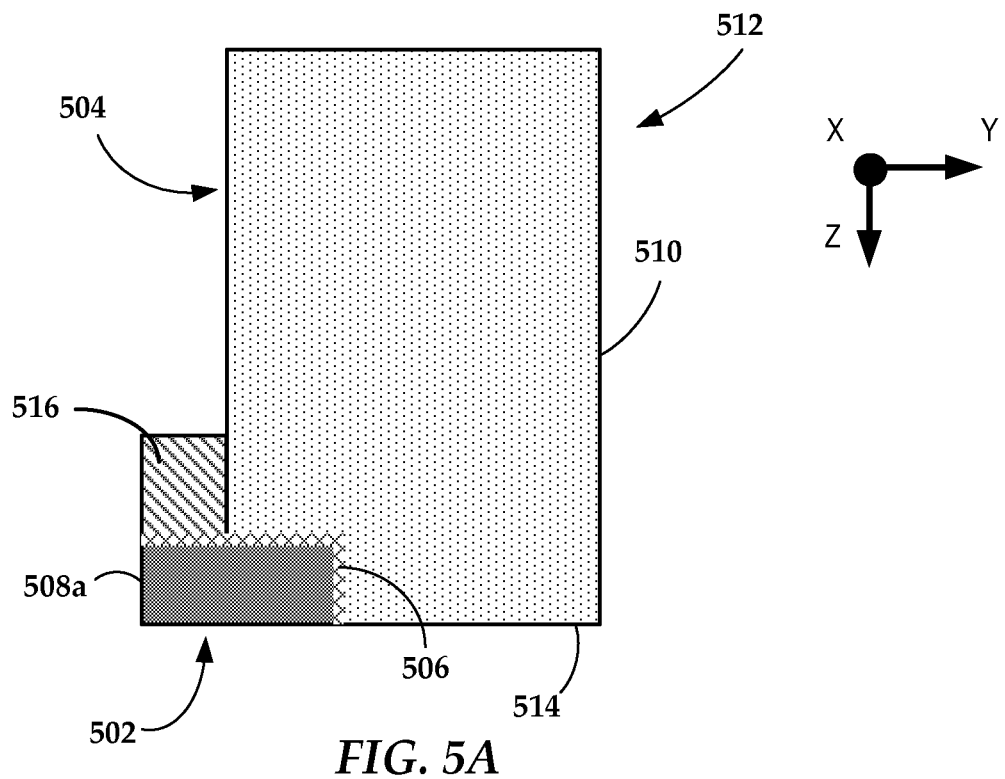
FIG. 5A is a second cross-sectional view of the near-field transducer and spacing element of FIG. 5.

FIG. 5 shows a cross-sectional view of another embodiment of an NFT 512 and a spacing element 516. FIG. 5A is a second cross-sectional view of the NFT 512 and the spacing element 516. As illustrated in FIGS. 5 and 5A, the NFT 512 includes a peg region 502, an enlarged region 504, and a barrier material 506. Additionally, the peg region 502 includes surface 508a and the enlarged region 504 includes arcuate surface 510 and bottom surface 514.

The general characteristics of the NFT 512 have been previously described in reference to the NFT 512 of FIGS. 5 and 5A, and, therefore, will not be described in great detail. However, the embodiment of FIGS. 5 and 5A differs from that of FIGS. 3 and 3A in that the barrier material 506 is disposed between enlarged region 504 and peg region 502 and is additionally disposed between the NFT 512 and the spacing element 516. The spacing element 516 is disposed to interface with the peg region 502 and extends between the enlarged region 504 and a pole (e.g., the magnetic recording pole 215 of FIG. 2). In the illustrated embodiment, the spacing element 516 is dispose around several side surfaces (e.g., surfaces 308a, 308b, and 308c in FIGS. 3 and 3A) but does not contact peg region 502 as barrier material 506 is disposed therebetween. Thus, only the surface 508a, as well as a bottom surface of the peg region 502 are not encapsulated by the barrier material 506. The spacing element 516, also called a NFT to pole spacing ("NPS"), can be formed by a deposition process in some instances, and can be comprised of an electrically insulating material. It is also desirable in some instances that spacing element 516 has appreciable optical figure of merit.

Figure 6:
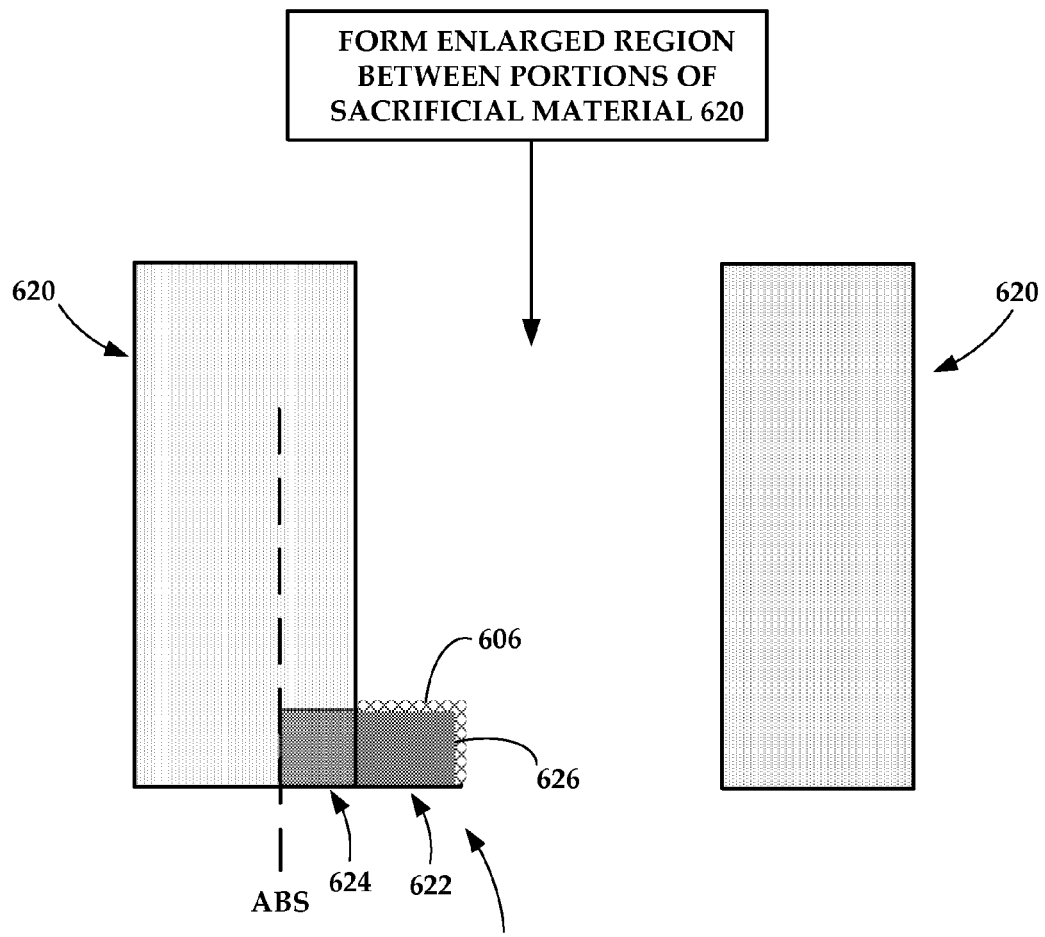
FIG. 6 is an illustration of one step in various fabrication techniques used to form a near-field transducer.

FIG. 6 illustrates a one step in a method of fabricating an NFT. As illustrated in FIG. 6, the peg region 602 is formed using known lithography methods prior to formation of the enlarged region. A sacrificial material 620, such as a photoresist, is disposed over a first portion 622 of the peg region 602, leaving a second portion 624 of the peg region 602 exposed. A barrier material 606 is fabricated over the second portion 624 of the peg region 602.

In one embodiment, the barrier material 606 is fabricated using a vacuum deposition (dc/rf/reactive sputtering, ion beam deposition, evaporation) or an electroplating process that disposes a metal such as Rh, Zr, Hf, Ru, Ir, W, Mo, Co and alloys thereof over one or more surfaces of the second portion 624. In another embodiment, the barrier material 606 is fabricated by applying a nitride forming compound such as Zr, Ti, Au, Ta, W in low concentrations, i.e., <1 by weight %. In some embodiments, nitrides formed with the disclosed compounds act as an effective diffusion barrier when they form stoichiometric nitrides having the lowest achievable resistivity and highest achievable optical figure of merit to the peg region 602. The nitride forming compound can be applied as a diffuse dopant or as a layer in the formation of the peg region 602. The exposed second portion 624 containing the nitride forming compound can be annealed in nitrogen or nitrogen plasma at or relatively near atmospheric pressure at a temperature between about 100° C. and about 400° C. for a duration of up to several hours. The annealing process causes the nitride forming compound to form nitrides such as ZrN, TiN, AuN, TaN, WN along the one or more surfaces of the second portion 624 (i.e., the surfaces exposed to the nitrogen or nitrogen plasma). In yet another embodiment, the barrier material 606 can be comprised of AuN and is fabricated by annealing the exposed second portion 624 of the peg region 602 in nitrogen or nitrogen plasma at or relatively near atmospheric pressure at a temperature between about 100° C. and about 400° C. for a duration of up to several hours. In another embodiment, the barrier material 606 can be comprised of AuO and is fabricated either electrochemically or by annealing the exposed second portion 624 of the peg region 602 in oxygen or oxygen plasma at or relatively near atmospheric pressure at a temperature between about 100° C. and about 400° C. for a duration of up to several hours. In yet additional embodiments, the exposed second portion 624 can undergo radical shower treatment. Radical shower treatment is another type of plasma treatment (using oxygen or nitrogen) where a voltage is applied to a shower head/plate inside the chamber rather than to the substrate/wafer. Radical shower treatment can help to form controlled metal oxides or metal nitrides. In yet another embodiment, the barrier material 606 can be fabricated by one or more of electroplating one or more surfaces of the second portion 624 and performing ALD over one or more surfaces of the second portion 624. ALD can form a thin metal cap (film) of ALD metal(s) over the various surfaces including an end surface 626 of the second portion 624.

The enlarged region (e.g., the enlarged region 304 of FIGS. 3, 3A) is formed between the portions of the sacrificial material 620. Thus, the enlarged region is disposed adjacent and along the second portion 624 of the peg region 602 such that the barrier material 606 is disposed at least between the second portion 624 and the enlarged region (not shown in FIG. 6) to reduce interdiffusion between the peg region 602 and the enlarged region. After formation of the enlarged region 604, the sacrificial material 620 can be removed using lithography processes such as ion milling and other techniques.

Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations or variations of the specific embodiments discussed herein. Therefore, it is intended that this disclosure be limited only by the claims and the equivalents thereof. All references cited within are herein incorporated by reference in their entirety.

What is claimed is:

1. An apparatus, comprising:
a near field transducer comprising a peg region and an enlarged region disposed adjacent the peg region; and
a barrier material separating the peg region from the enlarged region, the barrier material configured to reduce or eliminate interdiffusion of material between the peg region and the enlarged region;
wherein the peg region remains in one or both of optical and electrical communication with the enlarged region.

2. The apparatus of claim 1, wherein the peg region comprises a plasmonic metal.

3. The apparatus of claim 2, wherein the enlarged region comprises a second plasmonic metal that has a same composition as the plasmonic metal of the peg region.

4. The apparatus of claim 1, wherein the barrier material comprises one or more of ZrN, TiN, Rh, Zr, Hf, Ru, AuN, AuO, TaN, Ir, W, Mo, Co, and alloys thereof.

5. The apparatus of claim 1, wherein the barrier material comprises one or more layers that separate the peg region from the enlarged region.

6. The apparatus claim 1, wherein the barrier material extends along a non-media interfacing end of the peg region.

7. The apparatus of claim 1, wherein the barrier material has a thickness of between about 1.0 nm and about 10.0 nm.

8. The apparatus of claim 1, wherein the barrier material is disposed only between the enlarged region and the peg region.

9. The apparatus of claim 1, wherein the barrier material is disposed between the enlarged region and the peg region and along one or more additional surfaces of the enlarged region.

10. The apparatus of claim 1, wherein the enlarged region is a disk shaped object.

11. An apparatus, comprising:
a slider;
a reader and a writer at the slider;
an optical waveguide at the slider;
a near field transducer at the slider proximate the writer and the optical waveguide, the near field transducer comprising a peg region and an enlarged region disposed adjacent the peg region; and
a barrier material separating the peg region from the enlarged region, the barrier material configured to reduce or eliminate interdiffusion of material between the peg region and the enlarged region, wherein the peg region remains in one or both of optical and electrical communication with the enlarged region.

12. The apparatus of claim 11, wherein the peg region comprises a plasmonic metal.

13. The apparatus of claim 12, wherein the enlarged region comprises a second plasmonic metal that has a same composition as the plasmonic metal of the peg region.

14. The apparatus of claim 11, wherein the barrier material comprises one or more of ZrN, TiN, Rh, Zr, Hf, Ru, AuN, AuO, TaN, Ir, W, Mo, Co, and alloys thereof.

15. The apparatus of claim 11, wherein the barrier material comprises one or more layers that separate the peg region from the enlarged region.

16. The apparatus claim 11, wherein the barrier material extends along a non-media interfacing end of the peg region.

17. The apparatus of claim 11, wherein the barrier material has a thickness of between about 1.0 nm and about 10.0 nm.

18. The apparatus of claim 11, wherein the barrier material is disposed only between the enlarged region and the peg region.

19. The apparatus of claim 11, wherein the barrier material is disposed between the enlarged region and the peg region and along one or more additional surfaces of the enlarged region.

20. The apparatus of claim 11, wherein the enlarged region is a disk shaped object.

* * * * *